Patented Dec. 23, 1941

2,266,754

UNITED STATES PATENT OFFICE 2,266,754

SYNTHESIS OF VITAMIN B6

Stanton A. Harris, Westfield, N. J., assignor to Merck & Co., Inc., Rahway, N. J., a corporation of New Jersey No Drawing. Application October 28, 1939,
Serial No. 301,733

6 Claims. (Cl. 260—296)

This invention relates to the synthesis of vitamin B6 and to various intermediates employed in its production.

In a co-pending application, Serial No. 267,603, is shown a process for the production of vitamin B6, in which 3-cyano-4-ethoxymethyl-5-nitro-6-methyl-pyridone-2 is chlorinated with phosphorus pentachloride, reduced with hydrogen in the presence of a catalyst, diazotized, and the resulting product hydrolyzed to form vitamin B6.

I have discovered that vitamin B6 may be obtained by reducing 3-cyano-4-alkoxymethyl-5-nitro-6-methyl-pyridone-2 to form 3-cyano-4-alkoxymethyl-5-amino-6-methyl-pyridone-2, treating the latter compound with phosphorus pentachloride and phosphorus oxychloride to form 2-methyl-3-amino-4-alkoxymethyl-5-cyano-6-chloropyridine, reducing the latter compound with hydrogen in the presence of a catalyst to form 2-methyl-3-amino-4-alkoxymethyl-5-aminomethylpyridine, hydrolyzing the latter compound to form 2-methyl-3-amino-4-hydroxymethyl-5-aminomethylpyridine, which on diazotization yields vitamin B6.

Variations may be made in this synthesis. For example, 2-methyl-3-amino-4-alkoxymethyl-5-cyano-6-chloropyridine may be acetylated with acetic anhydride to form 2-methyl-3-diacetyl-amino-4-alkoxymethyl-5-cyano-6-chloropyridine, hydrogenating the latter compound to form 2-methyl-3-diacetylamino-4-alkoxymethyl-5-aminomethylpyridine, hydrolyzing the latter compound to form 2-methyl-3-amino-4-alkoxymethyl-5-aminomethylpyridine, hydrolyzing the latter compound to form 2-methyl-3-amino-4-hydroxymethyl-5-aminomethylpyridine, and diazotizing the latter compound to form vitamin B6.

Alternatively, 2-methyl-3-amino-4-alkoxymethyl-5-cyano-6-chloropyridine may be treated with acetic anhydride under somewhat less drastic conditions to form 2-methyl-3-acetylamino-4-alkoxymethyl-5-cyano-6-chloropyridine, which may be used in the production of vitamin B6 according to the same procedure as outlined above for the corresponding diacetylamino derivative.

I have also discovered that 3-cyano-4-alkoxymethyl-5-amino-6-methyl-pyridone-2 may be treated with acetic anhydride to form 3-cyano-4-alkoxymethyl-5-acetylamino-6-methyl-pyridone-2. This compound is also obtained when 3-cyano-4-alkoxymethyl-5-nitro-6-methyl-pyridone-2 is reduced catalytically in the presence of acetic anhydride. However, if 3-cyano-4-alkoxymethyl-5-amino-6-methyl-pyridone-2 is heated with acetic anhydride, 3-cyano-4-alkoxymethyl-5-diacetylamino-6-methyl-pyridone-2 is formed.

The compounds of the present invention have the general formulae

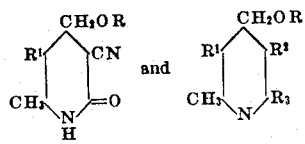

wherein R is an alkyl radical, R¹ is a member of the group amino, acetylamino and diacetylamino, R² is a member of the group cyano and aminomethyl, and R³ is a member of the group chlorine and hydrogen.

The following examples illustrate methods of carrying out the present invention, but it is to be understood that these examples are given by way of illustration and not of limitation.

*Example 1*

A mixture of 14.8 gm. of 3-cyano-4-ethoxymethyl-5-nitro-6-methyl-pyridone-2, 900 cc. of 95% alcohol, and 0.5 gm. of Adams catalyst is hydrogenated under three atmospheres pressure. The hydrogenation is completed in approximately 1 hour, when three mols of hydrogen are taken up. The mixture is filtered and the filtrate evaporated to dryness. The 3-cyano-4-ethoxymethyl-5-amino-6-methyl-pyridone-2 obtained is purified by recrystallization from alcohol. Yield 8.3 gm., M. P. 250-255° C. Additional material may be obtained from the mother liquor.

If desired, 4-alkoxymethyl-pyridones, other than 4-ethoxymethyl-pyridone, may be used as a starting material, such as 4-methoxymethyl, etc.

2 gm. of 3-cyano-4-ethoxymethyl-5-amino-6-methyl-pyridone-2 are treated with 15 to 20 cc. of phosphorus oxychloride and 4 gm. of phosphorus pentachloride, and allowed to stand overnight at room temperature (30° C.). The phosphorus oxychloride is removed under reduced pressure, and the residue treated with ice water. On neutralization with ammonia, crystalline 2-methyl-3-amino-4-ethoxymethyl-5-cyano-6-chloropyridine separates out. Yield, 0.38 (16.5%). After three recrystallizations from alcohol, it melts at 146-147° C.

A solution of 3.8 gm. of 2-methyl-3-amino-4-ethoxymethyl-5-cyano-6-chloropyridine in 20–25 cc. of acetic anhydride is refluxed for one-half hour. The acetic anhydride is removed by distillation under reduced pressure and the last trace destroyed by distilling with alcohol. 2-methyl - 3 - diacetylamino - 4 - ethoxymethyl - 5-cyano-6-chloropyridine crystallizes out of the alcohol, and is purified by recrystallization from 95% alcohol. Yield, 4.3 gm. or 82.5%; melting point 90–92° C. This compound is readily hydrolyzed by acid medium to the mono-acetyl compound.

A mixture of 3.09 gm. of 2-methyl-3-diacetylamino - 4 - ethoxymethyl - 5-cyano-6-chloropyridine, 100 cc. of glacial acetic acid, 0.82 gm. (one equivalent) of sodium acetate, 10 gm. of 5% palladium charcoal and 0.5 gm. of Adams catalyst, are hydrogenated under three atmospheres pressure. After the theoretical amount of hydrogen is absorbed, the solution is filtered, concentrated to a syrup, taken up in alcohol, and filtered from the separated sodium chloride. A solution of 2.5 gm. of picric acid in 10 cc. of alcohol is added to the solution of 2-methyl-3-diacetylamino - 4 - ethoxymethyl-5-amino-methylpyridine, and after several minutes of scratching, crystallization starts. The picrate of 2-methyl - 3 - diacetylamino - 4 - ethoxymethyl - 5-amino-methylpyridine obtained is purified by recrystallization from alcohol. Yield 2.6 gm.; M. P. 190–191° C.

7.7 gm. of the picrate of 2-methyl-3-diacetylamino - 4 - ethoxymethyl-5-aminomethylpyridine is dissolved in 25 cc. of hydrochloric acid (1:1), and the picric acid is extracted with 20 cc. of nitrobenzene and then with ether until no yellow color remains. The mixture is refluxed for one and one-half hours, then evaporated, and the residue recrystallized from a mixture of alcohol and acetone. The 2-methyl-3-amino-4-ethoxymethyl -5-aminomethylpyridine-dihydrochloride, when dried at 100° C. under a high vacuum, melts at 204 to 205° C. If desired, the free base of this compound may be obtained by treatment with an alkali, evaporation to dryness, and extraction with an organic solvent, such as alcohol or acetone.

2.24 gm. of 2 - methyl - 3 - amino-4-ethoxymethyl - 5 - aminomethylpyridine - dihydrochloride are dissolved in 34 cc. of 2.5 N hydrochloric acid, and heated in a bomb tube for 4 hours at 175–180° C. The slightly colored solution is filtered with charcoal, and concentrated to dryness under reduced pressure. The dihydrochloride of 2-methyl - 3 - amino-4-hydroxymethyl-5-aminomethylpyridine obtained is recrystallized from water and alcohol. Yield 1.44 gm. (76.7%), M. P. 235–237° C. The free base of this compound may be obtained by treatment with an alkali, evaporation to dryness, and extraction with an organic solvent, such as alcohol or acetone.

A solution of 1.28 gm. of 2-methyl-3-amino-4-hydroxymethyl-5-aminomethylpyridine-dihydrochloride in 22 cc. of water and a solution of 2.2 gm. of sodium nitrite are added simultaneously to 45 cc. of hot (90–95° C.) 2.5 N hydrochloric acid. The yellow solution is concentrated to dryness under reduced pressure, and the residue washed with acetone, which removes some of the color. The vitamin B6 hydrochloride is extracted from the sodium chloride with hot absolute alcohol. This solution is filtered with charcoal, and concentrated to a small volume. On addition of acetone, the vitamin B6 hydrochloride crystallizes. Yield, 0.5 gm. (45.4%); M.P. 208° C.

*Example 2*

2.5 gm. of 3-cyano-4-ethoxymethyl-5-amino-6-methylpyridine-2 are dissolved in a hot mixture of 10 cc. of anhydrous pyridine and 3.5 cc. of acetic anhydride. After ten minutes, the solution is poured into about 10 cc. of ice water, whereupon 3-cyano-4-ethoxymethyl-5-diacetylamino-6-methyl-pyridone-2 separates and is filtered off. It is purified by recrystallization from a small quantity of alcohol. Yield, 1.25 gm.; M. P. 176° C.

Alternatively, 5.1 gm. of 3-cyano-4-ethoxymethyl-5-amino-6-methyl-pyridone-2 is refluxed with 25 cc. of acetic anhydride for 2 hours. The acetic anhydride is removed by concentration in vacuo, and is concentrated several times with alcohol to remove the acetic anhydride. The product is an oily material which crystallizes after standing for several days. After three recrystallizations from 95% alcohol, the 3-cyano-4-ethoxymethyl - 5 - diacetylamino-6-methyl-pyridone-2 melts at 176° C.

*Example 3*

1 gm. of 3-cyano-4-ethoxymethyl-5-amino-6-methyl-pyridone-2 is dissolved in 10 cc. of warm acetic anhydride which is then removed by evaporation under reduced pressure. The residue is treated with ethyl acetate which dissolves the unchanged starting material and leaves 3-cyano-4-ethoxymethyl-5-monoacetylamino - 6 - methyl-pyridone-2 as a residue. It is recrystallized from ethyl alcohol, M. P. 260° C.

Alternatively, 23.5 gm. of 3-cyano-4-ethoxymethyl-5-nitro-6-methyl-pyridone-2 are dissolved in 200 cc. of acetic anhydride and hydrogenated in the presence of 3 gm. of Adams catalyst. After 3 mols of hydrogen are absorbed, the reduction is stopped and the material filtered. 3-cyano-4-ethoxymethyl-5 - monoacetylamino-6-methyl-pyridone-2 is recovered by recrystallizing the precipitate from 95% alcohol. Yield of first crop 13.3 gm., or 53.4%. On evaporation of the mother liquor an additional quantity of material is obtained.

*Example 4*

2 gm. of 2-methyl-3-amino-4-ethoxymethyl-5-cyano-6-chloropyridine are dissolved in 10 cc. of warm acetic anhydride and allowed to crystallize by cooling. The mixture is filtered and 1 gm. of starting material recovered. The acetic anhydride is decomposed by mixing with cold water. The product is extracted with four 10 cc. portions of chloroform, and the extracts washed with cold, saturated sodium bicarbonate solution until neutral, and finally with water and dried over calcium chloride. The chloroform is evaporated off and the residue 2-methyl-3-acetylamino-4-ethoxymethyl-5-cyano-6 - chloropyridine recrystallized from 95% alcohol, M. P. 134–136° C.

Modifications may be made in carrying out the present invention without departing from the spirit and scope thereof, and I am to be limited only by the appended claims.

I claim:

1. Compounds of the formula:

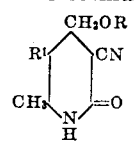

wherein R is an alkyl radical, and R¹ is a member of the group amino, acetylamino, and diacetylamino.

2. 3-cyano-4-ethoxymethyl-5-amino-6-methyl-pyridone-2.

3. 3-cyano-4-ethoxymethyl-5-diacetylamino-6-methyl-pyridone-2.

4. 3-cyano-4-ethoxymethyl-5-acetylamino-6-methyl-pyridone-2.

5. In the synthesis of vitamin $B_6$, the step which comprises reacting 3-cyano-4-ethoxymethyl-5-nitro-6-methyl-pyridone-2 with hydrogen in the presence of a catalyst.

6. In the synthesis of vitamin $B_6$, the step which comprises treating 3-cyano-4-ethoxymethyl-5-amino-6-methyl-pyridone-2 with acetic anhydride.

STANTON A. HARRIS.

CERTIFICATE OF CORRECTION.

Patent No. 2,266,754. December 23, 1941.

STANTON A. HARRIS.

It is hereby certified that error appears in the printed specification of the above numbered patent requiring correction as follows: Page 2, second column, line 3, for "6-methylpyridine-2" read --6-methylpyridone-2--; and that the said Letters Patent should be read with this correction therein that the same may conform to the record of the case in the Patent Office.

Signed and sealed this 28th day of July, A. D. 1942.

(Seal)
Henry Van Arsdale,
Acting Commissioner of Patents.